United States Patent [19]
Kinzel

[11] 3,884,317
[45] May 20, 1975

[54] ELECTRICALLY POWERED CYCLE

[76] Inventor: Augustus B. Kinzel, 1738 Castellana Rd., La Jolla, Calif. 92037

[22] Filed: Mar. 5, 1974

[21] Appl. No.: 445,826

[52] U.S. Cl.............. 180/34; 180/65 R; 310/67 A; 310/156
[51] Int. Cl............................................. B60l 11/12
[58] Field of Search............ 180/31, 33 C, 34, 65 R, 180/65 F; 310/67 A, 156; 318/139

[56] References Cited
UNITED STATES PATENTS

| | | | |
|---|---|---|---|
| 552,271 | 12/1895 | Bolton | 180/34 X |
| 572,036 | 11/1896 | Theryc | 180/34 X |
| 598,819 | 2/1898 | Scott | 180/34 X |
| 656,323 | 8/1900 | Hansel | 180/34 |
| 1,562,903 | 11/1925 | Miller | 180/65 R |
| 2,179,418 | 11/1939 | Mc Donald | 180/34 X |
| 2,595,749 | 5/1952 | Arnot | 180/65 R |
| 3,329,444 | 7/1967 | Lidov | 280/210 |

FOREIGN PATENTS OR APPLICATIONS

| | | | |
|---|---|---|---|
| 591,470 | 8/1947 | United Kingdom | 180/34 |
| 1,021,263 | 2/1953 | France | 180/34 |
| 84,856 | 11/1956 | Netherlands | 180/33 C |
| 925,053 | 1947 | France | 280/210 |

*Primary Examiner*—David Schonberg
*Assistant Examiner*—Terrance L. Siemens
*Attorney, Agent, or Firm*—Connolly and Hutz

[57] ABSTRACT

A power operated cycle includes a manually powered generator which supplies energy to drive a motor associated with one of the wheels of the cycle for thereby imparting motion to the cycle.

10 Claims, 9 Drawing Figures

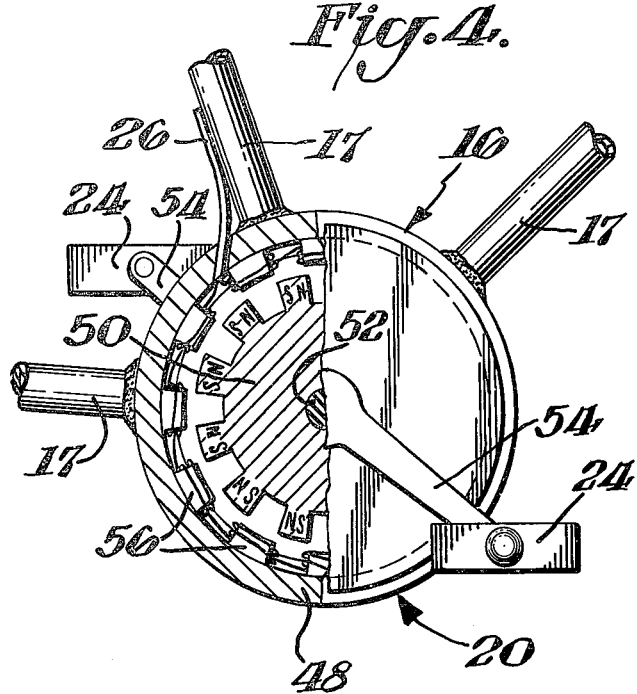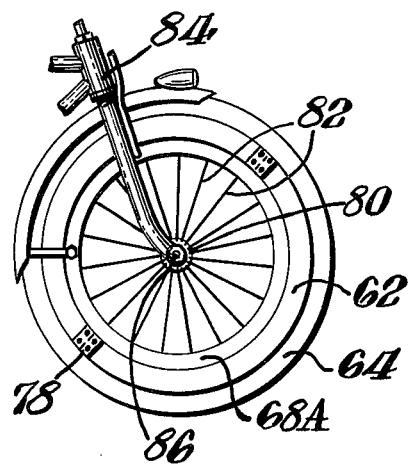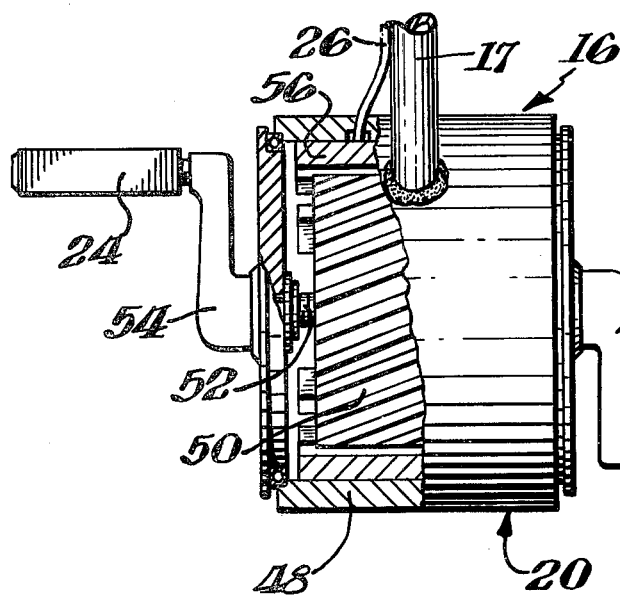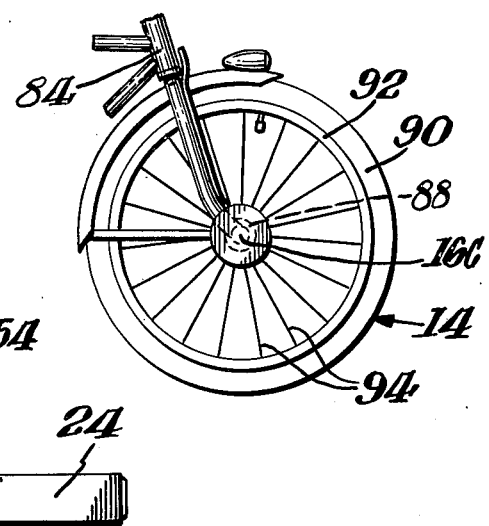

ELECTRICALLY POWERED CYCLE

BACKGROUND OF THE INVENTION

Various types of cycles have long been known and used in the art, not only as a means of transportation but also as a means of exercise. The recent trend has been to provide multiple speed cycles such as the three-speed, five-speed or ten-speed bicycles. Although with an ideal cycle there should be no limitation on the number of possible speeds, the fifteen-speed bicycle has become the ultimate in such multiple speed cycles. A further desirable feature which the art has been unable to obtain is to provide a safe workable cycle which has front wheel drive capabilities. Although front wheel bicycles have been attempted, front wheel drives are not practical with conventional cycles because of the use of a sprocket chain connection between the pedals and the driven wheel. Thus, if such a sprocket chain were attempted to be mounted to the front wheel, problems would arise in permitting the wheel to pivot during steering.

Various attempts have been made in the prior art to provide some form of power operated cycle but these have not included the use of a manual source of power, nor have they included means whereby a front wheel drive could be accomplished. Exemplary of these are U.S. Pat. Nos. 3,431,994 and 3,598,195. Other U.S. Pat. Nos. of interest are 3,713,502; 3,559,028; 3,444,946 and 1,562,903.

SUMMARY OF THE INVENTION

An object of this invention is to provide a power operated cycle capable of either front wheel and/or rear wheel drive.

A further object of this invention is to provide a power operated cycle capable of continuously variable speed operation.

A still further object of this invention is to provide a power operated cycle having front wheel drive and which eliminates the conventional sprocket chain mechanical drive of prior cycles.

In accordance with this invention a power operated cycle includes a manually powered generator which supplies energy to drive a motor associated with one of the wheels of the cycle for thereby imparting motion to the cycle.

A switch means or variable generator field current may be provided for controlling the ratio of the motor speed with respect to the generator speed to provide a variable speed drive capable of substantially infinite speeds. A short circuit means may be provided for the motor to act as a brake for the cycle.

In an advantageous form of this invention one of the wheels is formed as the motor itself by having the rim portion act as a rotor and the wheel portion mounted within the rim act as a stator.

THE DRAWINGS

FIG. 4 is a side view in elevation partly in section schematically illustrating the generator usable in the arrangement shown in FIGS. 1-3;

FIG. 5 is a side view of the generator shown in FIG. 4;

FIG. 8 is a front view in elevation of a further alternative motor arrangement in accordance with this invention; and FIG. 9 is a front view in elevation of still yet a further motor arrangement in accordance with this invention.

DETAILED DESCRIPTION

Figure 1:
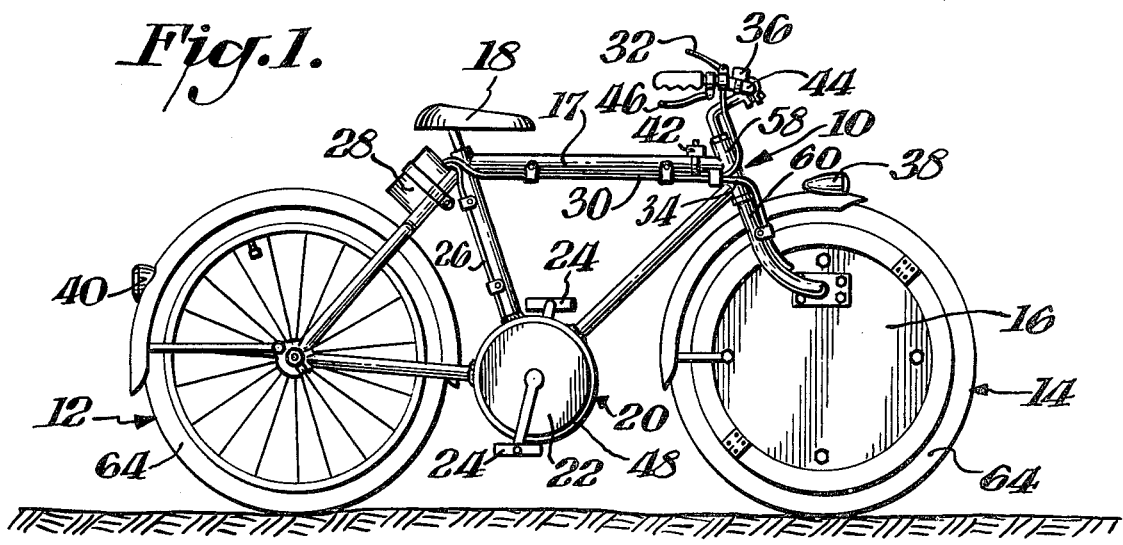
FIG. 1 is a side view in elevation schematically illustrating the concepts of this invention incorporated in a bicycle with front wheel drive.

FIG. 1 schematically illustrates the application of the concepts of this invention with respect to a bicycle 10. As indicated therein, the bicycle includes a rear wheel 12 and a front wheel 14 which are mounted to frame 17 with the conventional seat 18 being secured to the frame 17. Also secured to frame 17 is pedal assembly 20. In accordance with this invention the hub of the pedal assembly incorporates a generator 22 which advantageously receives its power from the user rotating pedals 24, 24. The front wheel 14 includes a motor assembly 16, as described in greater detail hereafter, which is powered by generator 22. In the illustrated embodiment the electrical cable 26 from generator 22 leads to storage battery 28 which is connected by cable 30 to motor 16. A switching device 32 has its cable 34 connected to motor 16 for purposes later described. Bicycle 10 further includes the conventional auxiliary equipment which is actuated by hand control unit 36. In the illustrated embodiment the auxiliary equipment includes, for example, headlight 38, taillight 40 and horn 42 all of which are electrically operated through generator 22 in accordance with the manipulation of control unit 36. Control unit 36 may advantageously be used to actuate or shut off all of the electrical components in the system by the incorporation of the proper circuitry.

The inventive arrangement in general operates in the following manner. The user steps on pedals 24 and rotates them in a conventional manner at a speed optimum for the human frame of about 70 rpm to drive electric generator 22 which in turn powers electric motor 16 mounted to the front wheel 14. Switching devices in the joining cables serve to set the ratio of motor speed to generator speed. In the illustrated embodiment a pressure type silicon rectifier switch 32 is provided similar to the type of finger operated switches conventionally available on various hand tools, such as power drills, so that there is in effect an infinite selection of variable speeds at which to operate. It is to be understood, of course, that other types of switches may be used in accordance with the teachings of this invention.

Alternatively, the generator and motor may be connected directly using the practice common to the Ward Leonard motor generator unit described in the standard electrical engineering handbooks whereby the excitation of the field of the generator controls the voltage amperage output automatically, or a modification thereof in which a small separate generator supplies the main generator field excitation current with switching to regulate this current as desired. In these constructions the battery would preferably be omitted.

Advantageously, the handle bar 44 also has mounted thereon a brake 46 which is a switching device for short circuiting motor 16 so that the motor-generator combination thus functions as a brake. Conventional friction brakes (not shown) may also be provided as an emergency or back-up brake.

The above described bicycle represents a significant departure from conventional arrangements in that the bicycle 10 eliminates stress on the rear wheel resulting from conventional chain drives which could thereby lend itself to lighter frame construction. Significantly, the above described arrangement also includes a cycle having front wheel drive with the obvious advantages over the standard bicycles particularly when encountering road bumps or skidding tendencies. Further the inventive arrangement provides essentially infinite speed ratios.

Figure 2:
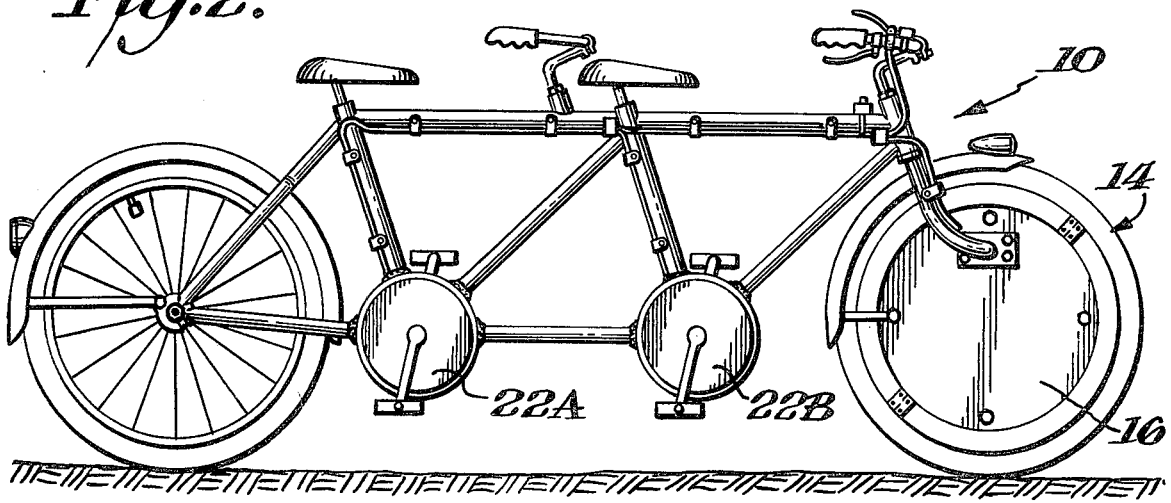
FIG. 2 is a side view similar to FIG. 1 showing an alternative arrangement wherein the bicycle thereof is the tandem type.
Figure 3:
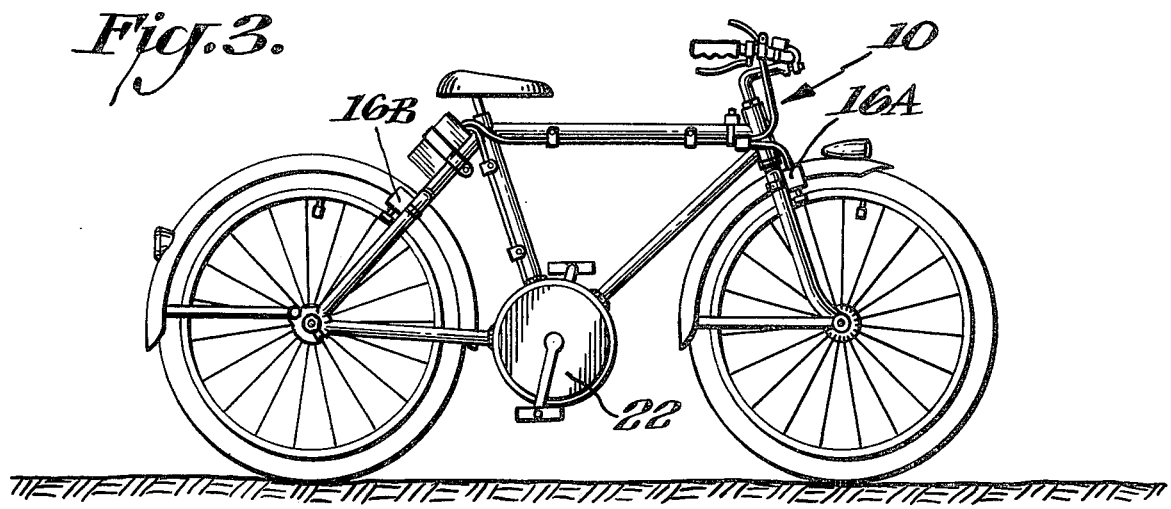
FIG. 3 is a side view similar to FIGS. 1-2 showing a further alternative of this invention with the drive provided for both wheels.

The concepts of this invention may be practiced in various forms. Thus the cycle may not only be a bicycle as illustrated in FIG. 1, but may be a tandem or bicycle-built-for-two as illustrated in FIG. 2. The concepts in fact may even be utilized with a tricycle. Further the motor may be located on either the front wheel or rear wheel or, as illustrated in FIG. 3, a motor 16A and a further motor 16B are provided on the front and rear wheels, respectively, both of which are driven by the single generator 22 through appropriate cables.

In the arrangement shown in FIG. 2 wherein a tandem bicycle is illustrated, a pair of gnerators 22A, 22B are provided and with both generators 22A and 22B combining to power motor 16. As is readily apparent, the teachings of this invention may thus be practiced with various combinations and locations of generators and motors with or without the inclusion of any number of auxiliary batteries.

The basic concepts of this invention may be modified in various ways. For example, as illustrated in FIG. 1, the storage battery 28 could be utilized through control unit 36 to drive motor 16 until the generator 22 has acquired enough speed and power to then drive the motor 16. When the power of the generator is greater than demanded to propel the cycle at the desired speed such as when going down hill, the battery 28 is charged by the generator 22. Other possible modifications include the use of gearing in the pedal hub so that the pedaling could be applied through such gearing and a relatively high speed generator could be used.

FIGS. 4–5 illustrate the details of one form of generator 16. As indicated therein, the pedal unit or assembly 20 includes a housing 48 mounted to frame 17 and centrally located therein is a rotor 50 having axle 52 to which are connected arms 54 for mounting pedals 24. The pedaling action of the user causes rotor 50 to rotate so that in connection with stator 56 an electrical current is generated and transmitted through cable 26 as previously described. Various dimensional arrangements may be used for generator 16. In one form, for example, housing 48 may be as large as the pedal radius. As previously noted, where a high speed generator is used the pedaling could be applied through gears.

The speed selection may be either by means of a hand switch or may be automatic. In the illustrated arrangement a hand switch 32 is provided and there is no need for a special gauge. Where, however, an automatic switch is used it is desirable to employ a sensor to switch the switch up or down to obtain a proper speed ratio setting.

Figure 6:
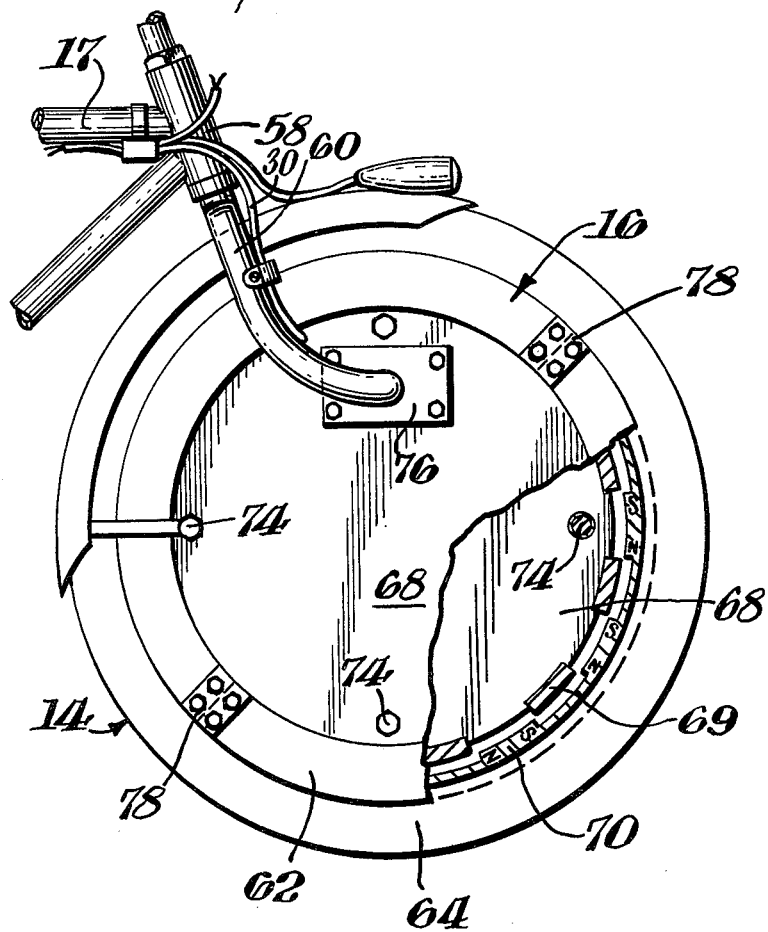
FIG. 6 is a side view in elevation partly broken away of a motor formed in accordance with this invention.
Figure 7:
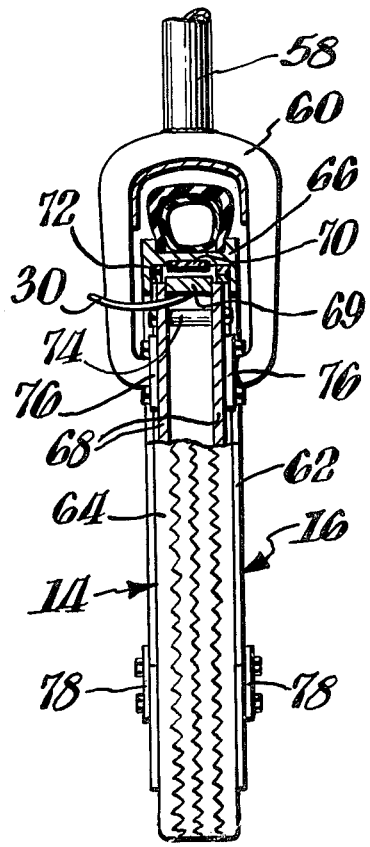
FIG. 7 is a front view in elevation partly broken away of the motor shown in FIG. 6.

FIGS. 6–7 illustrate in greater detail one form of motor 16 in accordance with this invention. As indicated therein, the frame 17 includes a steering column 58 which terminates at one end in handle bars 44 and terminates at the other end in a yoke 60 which is secured to the disc hub of wheel 14. Advantageously, the wheel itself forms the motor 16. In this respect wheel 14 includes a channel shaped rim 62 in the upper legs of which is mounted a conventional tire 64. Rim 62 also has a pair of depending legs 66 within which is mounted the disc hub portion 68. Advantageously, the rim portion acts as a rotor of motor 16 and is made, for example, of a non-magnetic metal having spaced magnets 70 disposed about its inner circumference. Hub 68 conversely is provided with coils 69 around its outer circumference disposed toward magnets 70 and receives electrical power transmitted from generator 22 through cable 30 so that the stator or wheel disc hub 68 causes the rotor 62 to rotate to thereby impart motion to the cycle. In the illustrated embodiment a suitable bearing means 72 such as fiberglass carbon bearings are provided to facilitate the rotary action of rim 62 with respect to stator or hub 68. The side walls of hub 68 are also mounted in their proper position by suitable spacers 74. Yoke 60 includes a pair of adjustable bearing plates 76 for firmly engaging the outer surfaces of hub 68. In this manner manipulation of the handle bars 44 causes pivotable movement of wheel 14. As previously noted, short-circuit means are provided for motor 16 to function as a brake. In the illustrated embodiment bearing plates 76 are disposed offset from the center of hub 68 and at the upper portion of the wheel. This short yoke has an advantage over conventional bicycles which must utilize a longer yoke to be mounted at the center line of the front wheel. FIG. 8, however, illustrates an alternative embodiment wherein the yoke extends to the center of wheel 14 with the bearing plates being mounted along the center line thereof.

As illustrated in FIG. 6, the rim 62 actually comprises a pair of semi-circular elements connected together by any suitable fasteners 78 so that during assembly the components of rim 62 may be separated to permit the stator or hub 68 to be mounted therein with the components of rim 62 then being reassembled and connected together.

The motor and wheel may take other forms than as illustrated in FIGS. 6–7 or in FIG. 2. As shown, for example, in FIG. 8 the stator 68A is ring-shaped (instead of being solid discs as in FIGS. 6–7) and is provided with a wheel hub 80 having spokes 82 joining the hub to the stator. The steering is accomplished by a steering column which is more similar to the conventional arrangements in that it includes a yoke 84 mounted to the axle 86 of hub 80. Otherwise the motor and wheel arrangement are similar to that illustrated in FIGS. 6–7.

FIG. 9 illustrates a further possible arrangement in accordance with this invention. As indicated therein a small generally conventional type motor 16C is mounted at the hub 88 of wheel 14 and the wheel is likewise more of a conventional variety which includes a tire 90 mounted on rim 92 connected to hub 88 by spokes 94. As in the previous embodiments, motor 16C is powered by the pedal-generator and rotates the axle of wheel 14 to impart motion to the cycle.

The size of the motor will vary in accordance with the desired results and the motor may, for example, be as little as 1/10 horsepower or as great as ½ horsepower.

It is to be understood that the above description is merely intended to exemplify in a schematic manner possible applications of the concepts of this invention. For the sake of simplicity, a detailed illustration and description of the various electrical and mechanical components necessary to carry out these concepts have not been illustrated since these details would be known to those skilled in the art once given the suggestions and guidelines of this invention as hereinbefore set forth. It is further to be understood that departures may, of course, be made from the illustrated embodiments within the concepts of this invention. The above description, however, does provide a teaching which significantly departs from the prior art by accomplishing a front wheel drive through the elimination of the conventional sprocket chain assembly and also by providing means for obtaining essentially infinite speed ratios, such features being long elusive to the prior art.

What is claimed is:

1. A power operated multiple wheel cycle comprising, a frame, front wheel means connected to said frame, rear wheel means connected to said frame, a user's station on said frame between said front wheel means and said rear wheel means for accommodating the user, pedal means at said user's station for being rotated by the force imparted by the user, a generator mounted to said frame driven by said pedal means, said generator having its generator field provided by permanent magnets, motor means associated with one of said wheel means for causing its wheel means to rotate for imparting motion to the cycle, and transmission means between said generator and said motor means whereby said generator drives said motor means to cause the cycle to move in accordance with energy imparted by the user to said pedal means.

2. The cycle of claim 1 wherein said cycle is a tandem bicycle having a plurality of user's stations each with a pedal means and a generator, and all of said generators energizing a single motor means.

3. The cycle of claim 1 wherein said generator includes a stator and a rotor, the current of said generator being generated in said stator, and said permanent magnets being incorporated in said rotor.

4. The cycle of claim 3 wherein said motor means includes a stator and a rotor, the current of said motor means being applied to its stator, and the rotor of said motor means incorporating permanent magnets.

5. The cycle of claim 1 wherein said user's station includes a hub in said frame disposed no higher than the vertical distance of the central axes of said front wheel means and said rear wheel means, said pedal means being rotatably mounted to said hub, said generator including a shaft on which its rotor is mounted, said pedal means being mounted to said shaft, and said motor means being associated with said front wheel means.

6. The cycle of claim 1 wherein said transmission means includes a silicon rectifier switch for permitting control of the voltage-amperage condition of the wattage of said generator in accordance with the torque requirements of the terrain over which the cycle may travel.

7. The cycle of claim 6 wherein said frame includes a handle bar disposed near said front wheel means, and the voltage-amperage condition of the generator wattage being controlled by a pressure actuated lever mounted to said handle bar.

8. A power operated multiple wheel cycle comprising, a frame, front wheel means connected to said frame, rear wheel means connected to said frame, a user's station on said frame between said front wheel means and said rear wheel means for accommodating the user, said user's station including a hub in said frame disposed with its central axis at a distance no higher than the vertical distance of the central axes of said front wheel means and said rear wheel means, said user's station further including a seat disposed generally above said hub, pedal means at said user's station rotatably mounted to said hub for being rotated by the force imparted by the user, a generator mounted in said hub of said frame, said pedal means being mounted to a shaft axially extending through said generator, the rotor of said generator being mounted for being driven by said pedal means, motor means associated with one of said front wheel means and said rear wheel means for causing its wheel means to rotate for imparting motion to the cycle, and transmission means between said generator and said motor means whereby said generator drives said motor means to cause the cycle to move in accordance with energy imparted by the user to said pedal means.

9. The cycle of claim 8 wherein said motor means is associated with said front wheel means, said generator including permanent magnets in its rotor, and said transmission means including switch means for permitting control of the voltage-amperage condition of the wattage of said generator.

10. A power operated multiple wheel cycle comprising, a frame, front wheel means connected to said frame, rear wheel means connected to said frame, a user's station on said frame between said front wheel means and said rear wheel means for accommodating the user, pedal means at said user's station for being rotated by the force imparted by the user, a generator mounted to said frame driven by said pedal means, motor means associated with one of said wheel means for causing its wheel means to rotate for imparting motion to the cycle, transmission means between said generator and said motor means whereby said generator drives said motor means to cause the cycle to move in accordance with energy imparted by the user to said pedal means, said motor means being incorporated in its wheel means, said wheel means having a rim portion and a disc hub, a tire mounted on said rim portion, said disc hub being mounted within and juxtaposed said rim portion, said rim portion and said disc hub comprising said motor means with said rim portion being the rotor and said disc hub being the stator, said transmission means connecting said generator to said stator, said wheel means incorporating said motor means in said front wheel means, said frame including a steering column, said steering column having a yoke portion engaging said stator, and said yoke portion engaging said stator off center with respect to said stator at a location substantially above the horizontal centerline of said stator.

* * * * *